UNITED STATES PATENT OFFICE.

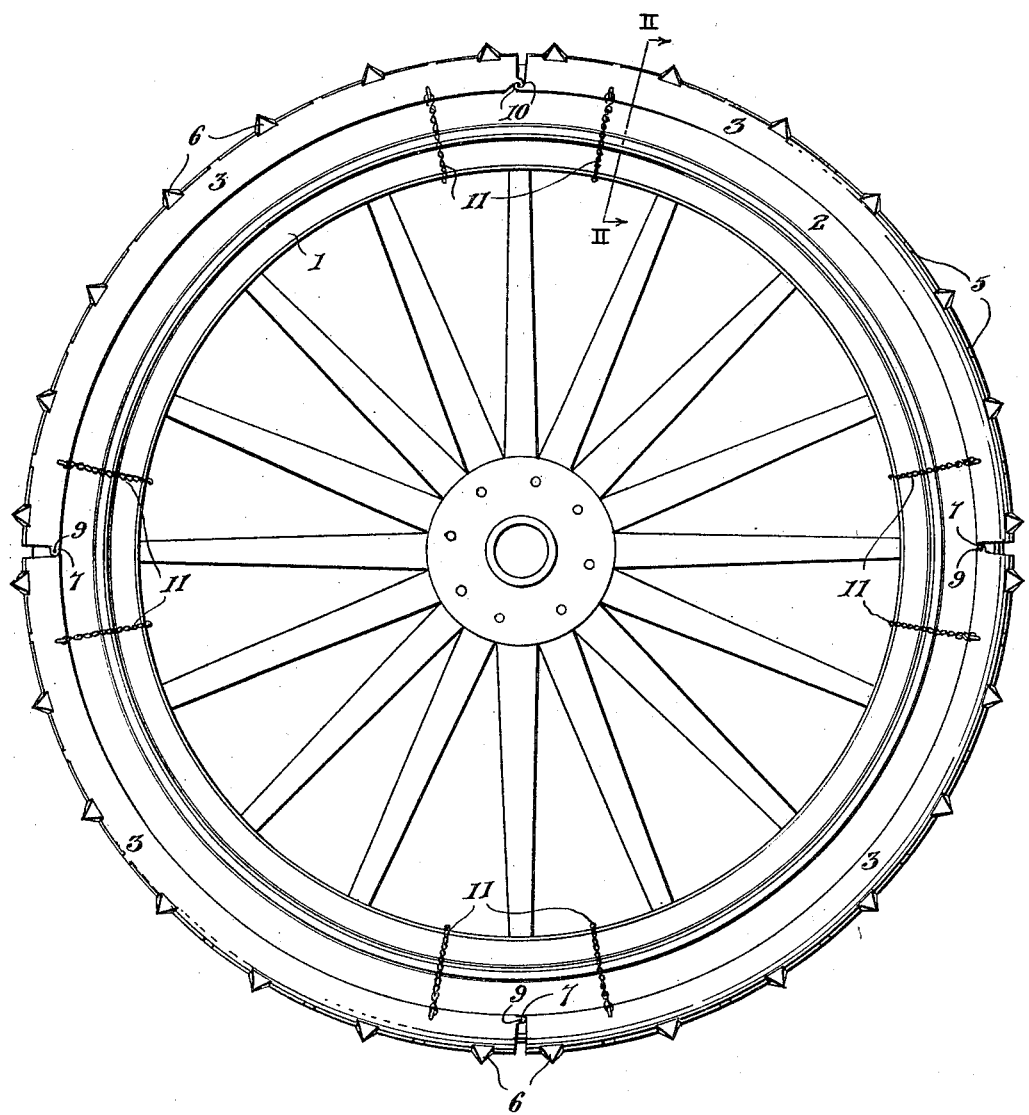

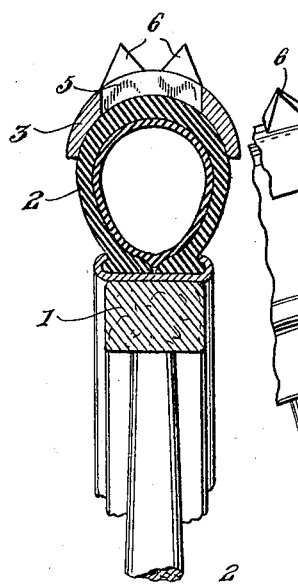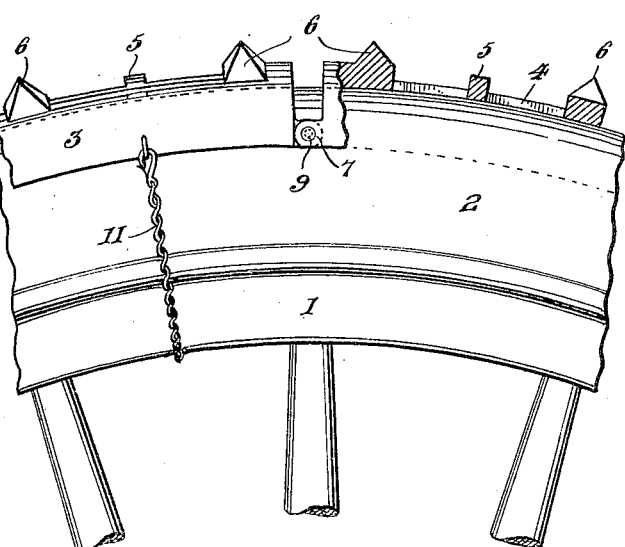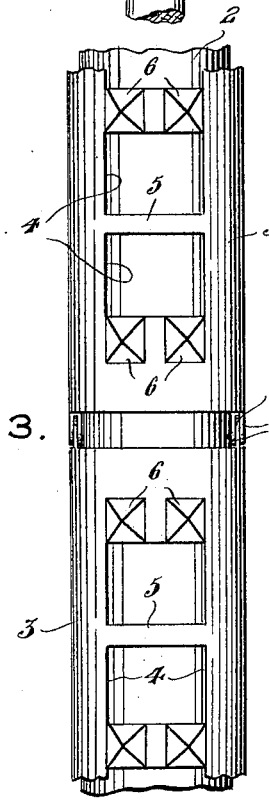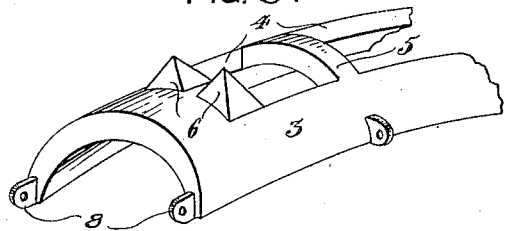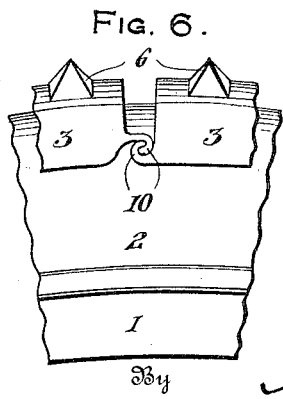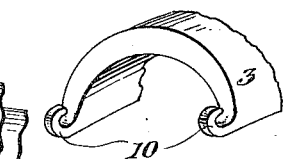

STEVEN BEKER, OF UNIONVILLE, MICHIGAN, ASSIGNOR OF ONE-HALF TO CHARLES B. ECKFELD, OF UNIONVILLE, MICHIGAN.

ANTISKID DEVICE.

1,398,356.   Specification of Letters Patent.   Patented Nov. 29, 1921.

Application filed July 22, 1920. Serial No. 398,189.

*To all whom it may concern:*

Be it known that I, STEVEN BEKER, a citizen of Hungary, residing at Unionville, in the county of Tuscola and State of Michigan, have invented certain new and useful Improvements in Antiskid Devices, of which the following is a specification.

This invention relates to certain new and useful improvements in anti-skid devices.

The primary object of the present invention resides in the provision of an anti-skid device adapted for attachment to a tread portion of an automobile to insure the proper gripping of an automobile wheel with a roadbed to eliminate slipping and skidding of the wheel upon the road.

A further object of the invention resides in the provision of an antiskid device for vehicle wheel tires wherein the device is formed of a plurality of link elements that extend completely over the tread surface of the tire to provide for a perfect traction of the wheel on a roadbed.

In the drawings, wherein like reference characters indicate corresponding parts throughout the several views, Figure 1 is a side elevational view of an automobile wheel having the present invention operatively positioned thereon, Fig. 2 is a cross sectional view taken on line II—II of Fig. 1 showing the anti-skid device extending over the tread portion of the tire, Fig. 3 is a fragmentary top plan view of the tire and anti-skid device in position, Fig. 4 is a fragmentary side elevational view, partially in section, showing the hinge connection between adjacent ends of the tread members, Fig. 5 is a perspective view of one of the anti-skid devices removed from the tire and partially broken away, Fig. 6 is a fragmentary side elevational view showing the hook connection between the free ends of the anti-skid members, and Fig. 7 is a fragmentary perspective view showing the hooks upon one of the anti-skid members.

The present invention is adapted for application to a wheel of any type desired, there being illustrated an automobile wheel embodying a hub with radiating spokes that carry a felly 1 and a tire shoe 2.

The anti-skid device is formed of a series of connected link plates that are curved in cross section coincident to the curvature of the tire shoe 2, the anti-skid plate embodying a body portion 3 having the side edges thereof uninterrupted as shown in Figs. 1 and 5 while the tread or intermediate portion is cutaway as at 4 to provide tread openings with central cross bars 5. As shown more clearly in Fig. 3, the walls of the opposite ends of the openings 4 are provided with spur blocks 6 that are outwardly directed therefrom for engagement with the roadbed as will be clearly obvious from an inspection of Figs. 2 and 4.

The anti-skid plates 3 are formed of sections having the adjacent ends thereof pivotally connected as shown in Figs. 3 and 5, one of the sections 3 carrying bifurcated corner lugs 7 to receive the single lugs 8 upon the opposed end of the adjacent link plate with a pivoting rivet 9 connecting the same. The several links are pivotally connected in this manner while detachable hook connection is provided between the outer ends of the end links, such connection being shown in Figs. 6 and 7, wherein the adjacent corners of the end links are provided with oppositely curved hooks 10 that engage each other as illustrated in Fig. 6, and being prevented from lateral slipping by the curvature of the tire, the several links are maintained in assembled relation on the tire tread.

When it is desired to attach the anti-skid device to the tire 2, the tire is partially deflated and the several links positioned about the tread portion thereof and the hooks 10 caused to engage each other, and upon inflation of the tire, the link plates 3 will be expanded and disengaging movement of the plate hooks 10 prevented. As a further guard against the escape of the link plates from the tire, securing chains 11 are detachably connected to the opposite sides of the plates 3 adjacent the corners thereof and pass inwardly around the wheel felly 1.

While there is herein shown and described the preferred embodiment of the present invention, it is nevertheless to be understood that minor changes may be made therein without departing from the spirit and scope of the invention as claimed.

What is claimed as new is:—

A tire protecting armor comprising a series of hingedly connected links adapted to surround the tire, each link having a rectangular opening in the tread portion thereof, a central transverse rib extending between the side walls of the opening and spur blocks carried by the tread links and adjacent each end of the opening.

In testimony whereof I affix my signature.

STEVEN BEKER.

In presence of—
CHAS. B. ECKFELD,
EMMET ECKFELD.